Oct. 20, 1959 — W. P. MELKA — 2,908,951
TOOL FOR USE IN SAND MOLDING
Filed May 3, 1957 — 2 Sheets-Sheet 1

INVENTOR.
William P. Melka
BY
Horton, Davis, Brewer & Brugman
Attorneys

Oct. 20, 1959 W. P. MELKA 2,908,951
TOOL FOR USE IN SAND MOLDING
Filed May 3, 1957 2 Sheets-Sheet 2
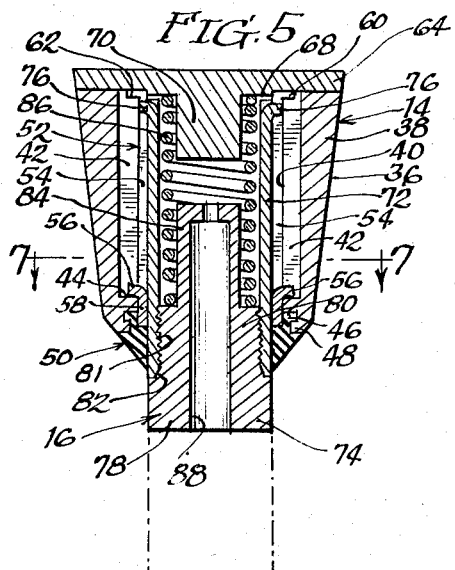
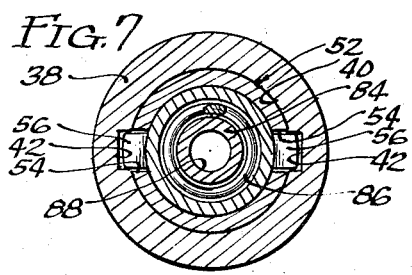
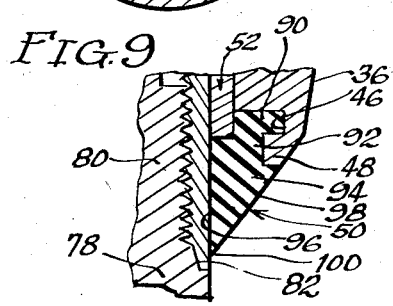
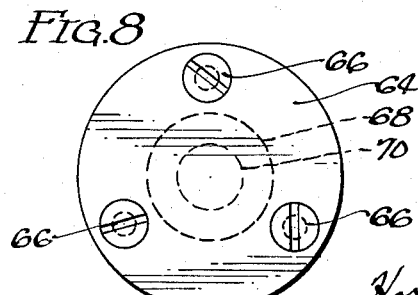
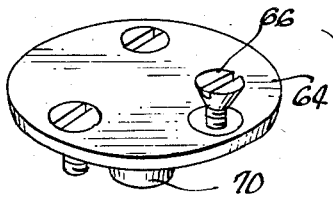
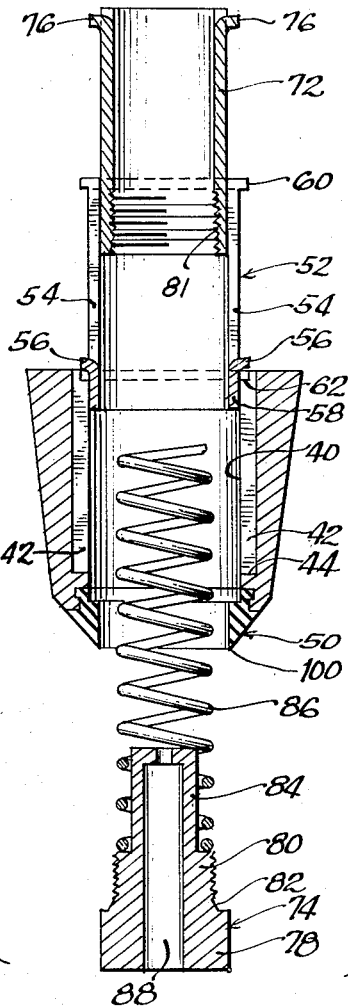
INVENTOR.
William P. Melka
BY
Horton, Davis, Brewer & Brugman
Attorneys

United States Patent Office 2,908,951
Patented Oct. 20, 1959

2,908,951

TOOL FOR USE IN SAND MOLDING

William P. Melka, Cicero, Ill.

Application May 3, 1957, Serial No. 656,946

5 Claims. (Cl. 22—38)

The invention relates to a tool for use in sand molding, and more particularly to a pouring cup down sprue tool.

The tool of the present invention is adapted for use in a sand mold for forming a sprue leading to the mold cavity, and an enlarged tapered cup leading to the sprue for facilitating pouring of the molten material through the cup and sprue to the cavity. The device includes a cup-forming part and a stem in slidable telescoping relationship to one another, so that they are longitudinally movable. The stem, in contracted position, is moved into the cup-forming part, and when extended, partially projects from the cup-forming part. The relative movement between the cup-forming part and the stem brings about a desirability for minimizing wear between the parts and the need for an effective seal between the parts.

An object of this invention is to provide a pouring cup and down sprue forming tool of the type to which reference has been made and in which full bearing is attained between the relatively movable stem and cup-forming parts.

Another object is to provide a tool of the kind indicated, in which the stem is axially or longitudinally slidable relative to the cup-forming part, but which has the parts interlocked with one another to prevent relative rotation therebetween, so that the stem moves rotationally with the cup-forming part to assist in removing the tool from a mold.

A further object of the invention is to provide a tool of the foregoing nature in which the stem has an extender detachably mounted thereon, whereby extenders of different dimensions may be interchanged for adapting the tool for use in producing molds within a wide range of dimensions.

Another object of my invention is to provide a tool for use in molding in which a seal is provided between a cup-forming part and a stem which are longitudinally movable relative to one another, which seal maintains an effective closure therebetween and is highly resistant to wear.

A further object of the invention is to provide a tool of the foregoing general character having a longitudinally slotted bearing sleeve interposed between the stem and the adjacent surrounding surface of the cup-forming part, and means on the cup-forming part for engaging the bearing sleeve to hold it in position and retain it against collapse.

My invention has for another object the provision of a device of the general character indicated above which is of unusually strong and rugged construction and in which worn parts are readily replaceable.

A further object of this invention is to provide a tool of the character indicated which, even though having the aforementioned advantageous features, is of extremely simple construction.

Other objects and advantages of the invention will appear from the following detailed description taken in conjunction with the accompanying two sheets of drawings in which:

Fig. 5 is an axial sectional view of the tool of my invention, showing the cup forming part and stem in a contracted or compressed position;

Fig. 6 is an exploded view, in axial section, of the tool shown in Fig. 5;

Fig. 7 is a sectional view taken substantially on line 7—7 of Fig. 5 and in the direction of the arrows;

Fig. 8 is a top end view of the tool shown in Figs. 5 and 6; and

Fig. 9 is a large scale view of a portion of the structure depicted in Fig. 5.

Figure 1:
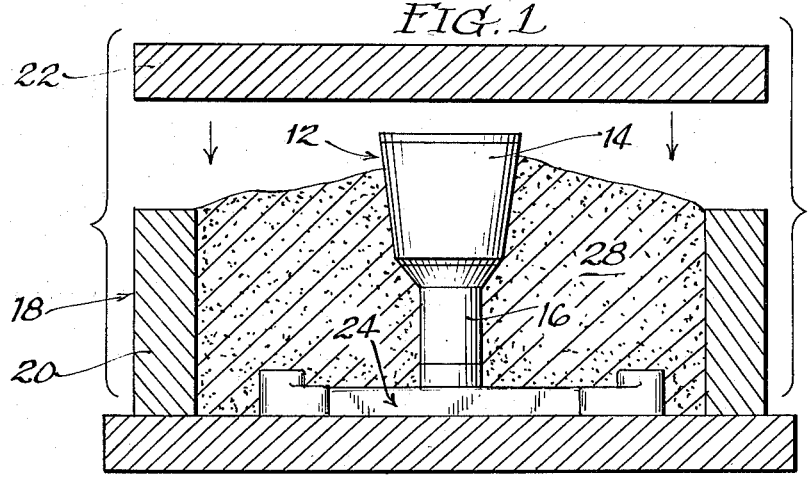
Fig. 1 is a vertical sectional view showing one step in the adaptation of a preferred embodiment of my pouring cup and down sprue forming tool to the production of a sand mold.
Figure 2:
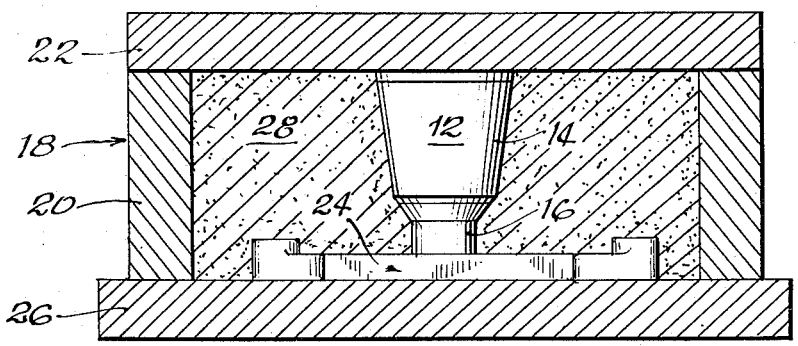
Fig. 2 is a view similar to Fig. 1, but illustrating a further step in the production of a mold with my pouring cup and down sprue forming tool.

Referring now in detail to the drawings, attention is directed first to Figs. 1 to 4 which illustrate the use of my disclosed tool in conjunction with the production of a sand mold. My pouring cup and down sprue forming tool is indicated in its entirety at 12 and is made up of two main parts, including a cup-forming part 14 and a stem 16, which stem is mounted in the cup-forming part 14 for longitudinal or axial sliding movement. In the production of a sand mold, in accordance with the exemplary illustration presented herein, the tool is to be used in conjunction with an outer mold forming housing which is designated generally at 18, and includes a cope 20 and a press board 22 which cooperates with the cope. Within the cope is a pattern 24 of the shape to be molded, which rests on the bottom of the plate 26 of the cope. The tool 12 is put in position on the pattern 24, and sand is put into the cope and compressed around the pattern and tool to provide a cavity in which the article corresponding to the pattern 24 may be molded. The tool 12 provides a sprue and a pouring cup for pouring the molten metal into a mold cavity 32 in sand 28. The sand, when initially compressed, is heaped somewhat over the walls of the cope to a suitable level, as indicated in Fig. 1. As shown in Fig. 1, the tool 12 is extended and projects from the pattern 24 to a position above the sand. The sand is compacted into the cope 20 by pressure movement of the top plate or press board downwardly into engagement with the tool 12, the sand 28, and the cope 20, to the position shown in Fig. 2. The bringing of the press board 22 into engagement with the cope 20 compresses the tool 12 and forces the stem 16 to retract into the body 14 a distance corresponding to the vertical dimensions of the mold parts and the thickness of the pattern therein.

Figures 3, 4:
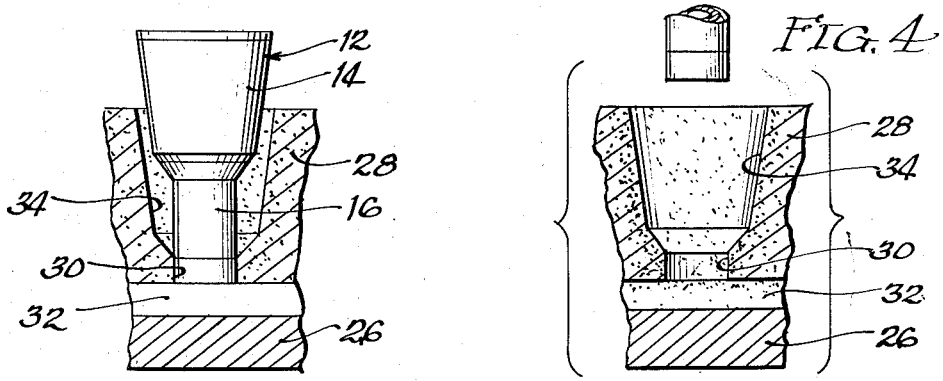
Fig. 3 is a vertical sectional view of a fragment of the upper portion or cope of the mold of Figures 1 and 2, with the tool of the invention in an extended or expanded position after having formed the intended sprue and cup.
Fig. 4 is a view similar to Fig. 3, but with the tool removed from the mold.

After thus forming the mold by compacting the sand 28, the top plate or press board 22 is removed from the cope, whereupon the tool 12 is to be removed from the sand for forming the sprue. Fig. 3 illustrates the re-extended position assumed by the tool 12 upon removal of the press board 22. The upper end of the tool extends to a position above the upper surface of the sand 28. The operator then grasps the body 14 and lifts the tool from the sand and preferably turns the tool while lifting to aid in preventing adhesions of sand thereto. Fig. 4 shows the elements immediately after removal of the tool. The tool 12 then has left a formation in the sand which includes a sprue cavity 30 communicating with a cavity 32 formed by the pattern 24. The sprue 30 also communicates with a cup 34 formed by the cup-forming part or body 14. The cup 34 and sprue cavity 30 then form a continuous opening from the exterior to the pattern cavity 32 after the pattern is removed for pouring molten metal into the cavity in the casting operation.

Referring now to Figs. 5 to 9 for the structural details of the tool, the body 14 may be made of suitable material, such as aluminum, which is light in weight and may be a casting. It has an outer surface 36 which is tapered to converge downwardly with respect to the normal position of use of the tool, as viewed in Figs. 1 to 5.

The body 14 may have a solid wall 38, but if desired, the wall may have cavities therein, particularly in the larger sizes thereof, so as to conserve metal and reduce the weight of the tool. The body 14 has an axial bore 40 extending longitudinally therethrough and has longitudinal grooves 42 on opposite sides of the inner surface thereof, which grooves open into the bore. The grooves 42 open through the upper end of the body, and terminate forwardly in shoulders 44 adjacent to, but spaced from the lower end of the body. There are preferably two grooves arranged diametrically opposite each other, but the specific number utilized may be as desired. Below the shoulder 44 is a recess or groove, facing radially inwardly and extending peripherally of the body. This recess or groove is defined on the lower side by an internal peripheral rib 48 having an inner diameter greater than the bore 40 and adapted for use in mounting a resilient sealing ring 50.

The body 14 is provided with a liner or bearing sleeve 52 engaging the surface of the bore 40 throughout the length thereof. The bearing sleeve 52 preferably is of bronze or other suitable material having high wear-resistant qualities. It is also provided with slots or grooves 54 which register with the grooves 42 in the wall of the bore of the body. At the lower end of the slots 54 are ears or tangs 56, which extend radially outwardly and are formed from the material of the wall of the bearing sleeve. These ears or tangs extend into the grooves 42 and serve to align the bearing sleeve with the body 14 and prevent relative rotation therebetween. These ears may engage the shoulders 44 to locate and hold the bearing at the lower end of the body. The portion of the bearing sleeve below the ears or tangs 56 is circumferentially continuous as indicated at 58 and this portion extends down below the surface of the bore 40 and below the recess or groove 46, and to a position approximately even with the lower end of the body 14. The lower end of the bearing sleeve, as will be explained more fully, cooperates with the body 14 in retaining the resilient sealing ring 50 in position in the assembly.

The bearing sleeve 52 at its upper end is provided with a circumferential radially outwardly extending flange 60 which is fitted in a corresponding counterbore or recess 62 in the top end surface of the body and which extends radially outwardly from the bore 40. Preferably the upper surface of the flange 60 is flush with the end surface of the body 14.

The upper end of the body 14 is covered and the bore is closed by a closure plate 64 secured to the body by suitable means, such as screws 66, adjacent the periphery of the plate. Preferably, the plate is of sufficient diameter to cover the entire upper end of the body and conforms in contour to the exterior of the body. The plate 64 is provided on its inner or under surface with a central boss 68 of relatively small longitudinal dimension, which engages the inner surface of the bearing sleeve 52 and prevents the tendency of the bearing sleeve to collapse because it is quite thin-walled, and since it is slotted through its upper end. The closure plate 64 is also provided with another central boss 70 of substantially lesser diameter than the boss 68, but of substantial axial extent, which projects into the bore and the bearing sleeve.

The stem 16 is mounted for sliding movements in the bore of the body and specifically in the bearing sleeve 52 in the bore, and is movable or reciprocable therein between a retracted position, such as that shown in Fig. 5, and a projected or extended position, such as that shown in Figs. 1 and 3. The stem 16 has surface bearing contact with the bearing sleeve 52 throughout that portion of the stem that is disposed in the bore. The stem 16, in the structure disclosed herein, includes an upper sleeve portion 72 which has a length corresponding generally to that of the bearing, and an insert or extender 74 secured in the lower end of the sleeve 72. The sleeve 72 is preferably made of steel, having high wear-resistant qualities and has relatively free sliding contact with the bearing sleeve 52, although the fit therebetween is such as to eliminate any undue side play. Furthermore, the sleeve extends throughout the full length of the bore from the closure plate 64 to the extreme lower end of the body including the resilient sealing ring 50. The sleeve 72 is also, for the most part, circumferentially continuous, but is provided at its upper end with oppositely extending ears or tangs 76 which extend into and are slidable along the slots 54 and may even extend into the grooves 42. The ears or tangs 76 prevent relative rotation between the stem and body while allowing free relative sliding movement therebetween. The upper end of the sleeve 72 or the ears 76, or both, may engage the closure plate 64 for providing a stop for limiting the movement of the stem 16 in a retracting direction within the body 14. At the opposite extreme, or when the stem 16 is moved in projecting direction, the ears 76 engage the ears 56 on the bearing sleeve 52 and serve as a stop for limiting the movement of the stem in that direction. The ears 56, when engaging the shoulders 44, may form together with the shoulders an effective single stop, but the ears 56 themselves may serve as such stop means, the thrust thereon being transmitted through the flange 60 at the upper end of the bearing sleeve to the surface of the counterbore 62. The latter arrangement may result in economy by reducing the necessity for precision in the manufacture of the parts.

The insert or extender 74 is detachably secured in the stem sleeve 72 in the illustrated structure, by being threaded at 81. This insert or extender has a lower or outer portion 78 which has a diameter substantially the same as the outer diameter of the sleeve 72 of the stem. Projecting inwardly or upwardly from the portion 78 of the extender is a portion 80 of reduced diameter which has the threads thereon for threaded securement to the sleeve. Between the portions 78 and 80 is an upwardly tapered surface 82 engageable with the inner surface of the sleeve, at the lower extremity of the latter, for producing wedging engagement with the sleeve and consequent tight fit therebetween, even when the parts become worn.

Upwardly of the portion 80 is a further portion 84 of reduced diameter constituting a boss and cooperating with the boss 70 on the top plate 64 to center a compression spring 86. This spring is utilized for biasing the stem 16 to projected or extended position and is normally compressed between the top plate 64 and the insert or extender 74. The end portions of the spring encompass and are centered and guided by the aligned bosses in all relative positions of the parts in use.

The insert or extender 74 is provided with a central bore or aperture 88 leading from the lower end face thereof to fit over a suitable locating pin on the pattern with which it is used. Also, by extending through the insert and opening into the interior of the sleeve 72 in the stem, this bore or aperture may be utilized for cleaning the interior of the stem by the injection of a cleaning fluid such as kerosene thereinto without the necessity for disassembling the device.

The portion 78 of the insert or extender 74 is of the same diameter as the exterior of the sleeve 72, as previously noted, and has an axial length such that it provides the desired overall axial or vertical extent of the tool, according to the length required by the mold in which it is used. This feature is of importance in that the insert or extender may be one of a number of such inserts, of different axial lengths, which are readily interchangeable for providing a selected overall length of the tool, and regardless of the extender selected, the sleeve and extender together will form a continuous and smooth sprue surface. Thus the tool is adaptable to use with molds having various depths within a wide range.

The resilient sealing ring 50 is made of suitable resilient material such as rubber or a rubber-like product, and serves the purpose of sealing the space between the stem 16 and the body 14. This sealing ring 50 has a radially outwardly extending rib 90 projecting peripherally from its top portion and which is fitted into the groove or recess 46 in the body. Connected to the radially inner portion of this rib 90 and extending axially therefrom, is a neck portion 92 which is disposed between the lower extremity of the bearing sleeve 52 and the rib 48 on the body. The neck 92 merges into a lower and main portion 94 of the sealing ring which has an inner surface 96 of generally cylindrical shape and engaging the outer surface of the stem, and particularly the sleeve 72 thereof. The sealing ring 50 has an outer surface 98 which tapers or converges downwardly, terminating in a sharp edge 100 which constitutes the lowermost extremity of the sealing ring. The rib 90 is held in the recess or groove 46 by being locked and held between the lower end of the bearing sleeve 52 and the adjacent portion of the body. This locking and holding action also extends to the neck portion 92 which is at least partially disposed between the bearing sleeve and adjacent portion of the body. Thus, the sealing ring 50 is firmly, but replaceably secured in position. The sealing ring may be inserted readily when the bearing sleeve is out of the body, after which that bearing sleeve may readily be inserted into locking and holding relationship with the ring. Preferably the remaining and lower portions of the locking ring complement the conformation of the adjacent elements and surfaces so as to provide the greatest volume of material of the ring within the outermost confines of the space permitted. An important advantage of this form of sealing ring is that the downwardly tapering portion 100, by virtue of terminating in the sharp edge, is drawn radially inwardly by the friction action of the stem 16 when it is moving in a retracting direction in the body, i.e., when the body is moved downwardly relative to the stem as is actually the case in a molding operation. This inward drawing action on the sealing ring prevents the migration of sand particles therepast, and it may be understood that the tendency for the grain to migrate in that direction is greater when the body 14 is moved downwardly relative to the stem and the tool is embedded in sand.

The ears 76 on the stem, while enabling free sliding movement of the stem relative to the body, prevent relative rotation therebetween and this works to an advantage in removing the stem portion of the tool from the sand. For example, as shown in Fig. 3, the user, in removing the tool from the sand, may grasp the exposed body 14 and turn the tool, as well as drawing outwardly on it. The turning action of the body is transmitted to the stem, and the turning action of the latter loosens the stem with a minimum tendency to damage the mold.

With the structure herein disclosed, the parts receiving the most wear are readily replaceable, eliminating the necessity for discarding the whole tool when it becomes worn.

The cover plate 64 serves as an effective closure member for the body, covering the entire upper surface of the body; thus the assembly, including the body proper and the closure plate, is capable of withstanding extremely rough usage without affecting the removability of the closure plate from the body.

It is understood that the foregoing description is merely illustrative of a preferred embodiment of the invention and that the scope of the invention is not to be limited thereto but is to be determined by the appended claims.

I claim:

1. A tool for use in molding and comprising a body having upper and lower ends and having a bore therein extending from end to end thereof and providing a bearing surface, an end plate secured to the upper end of the body and closing the upper end of the bore, the bearing surface of the bore having longitudinal grooves therein which terminate in stop shoulders internally of the lower end thereof, a stem slidable in the bore between retracted and projected positions and including a sleeve portion which extends the full length of the bore in said retracted position of the stem and has bearing engagement with the surface of the bore throughout that part of the length of the sleeve portion which extends into the bore in every position of the stem, the sleeve portion having outwardly projecting ears of limited length axially of the sleeve adjacent the upper end thereof and slidable longitudinally in said grooves, the shoulders constituting limit stops engaged by the ears for limiting sliding movement of the stem at the projected position thereof, the stem having a lower end portion exposed to the exterior of the body in all positions of the stem, and spring means within the sleeve and reacting between the end plate and stem for biasing the stem to said projected position.

2. A tool of the character disclosed comprising a body having a longitudinal bore therein and longitudinal grooves in the surface of the bore and terminating internally of one end of the bore, means closing the other end of the bore, a bearing sleeve in said bore with slots extending along a major portion of the length thereof and registering with and forming radial extensions of said grooves in the bore surface, said bearing sleeve also having lugs projecting radially therefrom at one end of the slots and projecting into said grooves in the body, a stem slidable in said bearing sleeve and having ears at one end thereof which extend into and are slidable in the spaces defined by said slots and grooves, said stem having a sleeve portion in bearing engagement with the bearing sleeve throughout that portion of the length of the sleeve portion that extends into the bore in every position of the stem and having an end portion spaced from said ears which is exposed to the exterior of the body in all positions of the stem, and spring means within said sleeve of said stem and reacting between said closing means and said end portion of the stem for biasing the stem upwardly of the bore.

3. A tool for use in molding, comprising a body having a passage therethrough from an upper end to a lower end, the surface of said passage having grooves extending longitudinally of the passage and opening through the upper end thereof, said grooves terminating internally of the lower end of said passage to provide stop shoulders, a bearing sleeve in said passage having slots extending to one end thereof and registering with and forming radially extensions of the grooves, said bearing sleeve also having lugs projecting outwardly into said grooves and engaging said stop shoulders, an end plate secured to and covering the entire upper end of the body and having a central boss fitting the inner surface of said bearing sleeve at said one end thereof to sustain the latter against collapse as a result of said slots, a stem slidable in said bearing sleeve and having an upper sleeve portion in engagement with the bearing sleeve throughout that portion of the length of the sleeve portion that extends into the bearing sleeve in all positions of said stem and having radially projecting ears adjacent the upper end thereof which are of a length axially of the sleeve substantially equal to the sleeve thickness and slidable in said grooves, said stem having a lower end portion exposed to the exterior of the body in all positions of the stem, and compression spring means interposed between said end plate and the lower end portion of the stem.

4. A tool for use in molding, comprising a body having a passage therethrough from an upper end to a lower end thereof, the surface of the passage having grooves extending longitudinally of the passage which terminate internally of the lower end of the passage to provide stop shoulders and open through the upper end thereof, a bearing sleeve in said passage having slots registering with and forming radially extensions of said grooves and opening through the upper end of said bearing sleeve, said bearing sleeve having thereon radially projecting ears slidable in said grooves and engaging said stop shoulders, an end plate secured to the upper end of said body and having a central boss fitting into the inner surface of said bearing sleeve to sustain the latter against collapse, a stem slidable in said bearing sleeve and having an upper sleeve portion in engagement with the bearing sleeve throughout that portion of the length of said sleeve portion that extends into said bearing sleeve in all positions of said stem and having radially projecting ears thereon adjacent the upper end thereof and slidable in said slots, the ears on said stem being engageable with said ears on said bearing sleeve for limiting the movement of said stem away from said end plate and relative to said body, and spring means within said sleeve portion of said stem and engaging said end plate for biasing said stem outwardly of the passage in the body.

5. A tool for use in molding, comprising a body having a passage therethrough from an upper end to a lower end thereof, the surface of the passage having grooves extending longitudinally of the passage which terminate internally of the lower end of the passage to provide stop shoulders and open through the upper end thereof, a bearing sleeve in said passage having slots registering with and forming radial extensions of said grooves and opening through the upper end of said bearing sleeve, said bearing sleeve having thereon radially projecting ears slidable in said grooves and engaging said stop shoulders, an end plate secured to the upper end of said body and having a central boss fitting into the inner surface of said bearing sleeve to sustain the latter against collapse, a stem slidable in said bearing sleeve and having an upper sleeve portion in engagement with the bearing sleeve throughout that portion of the length of said sleeve portion that extends into said bearing sleeve in all positions of said stem and having radially projecting ears thereon adjacent the upper end thereof and slidable in said slots, the ears on said stem being engageable with said ears on said bearing sleeve for limiting the movement of said stem away from said end plate and relative to said body, spring means within said sleeve portion of the stem and engaging said end plate for biasing the stem outwardly of the passage in the body, and a resilient sealing ring engaged and retained between the lower ends of said bearing sleeve and body and projecting from the lower end of the body, said sealing ring having a snug sliding fit with said stem.

References Cited in the file of this patent

UNITED STATES PATENTS

| | | |
|---|---|---|
| 695,146 | Davis | Mar. 11, 1902 |
| 1,354,259 | Lusk | Sept. 28, 1920 |
| 1,909,410 | Klosson | May 16, 1933 |
| 2,177,231 | Tinnerman | Oct. 24, 1939 |
| 2,275,806 | Perazo | Mar. 10, 1942 |
| 2,340,972 | Matthews | Feb. 8, 1944 |
| 2,424,712 | Scherer et al. | July 29, 1947 |
| 2,598,621 | Taccone | May 27, 1952 |
| 2,815,692 | Daniels | Dec. 10, 1957 |

FOREIGN PATENTS

| | | |
|---|---|---|
| 609,676 | Great Britain | Oct. 5, 1948 |